United States Patent [19]
Kolpak et al.

[11] Patent Number: 5,400,657
[45] Date of Patent: Mar. 28, 1995

[54] MULTIPHASE FLUID FLOW MEASUREMENT

[75] Inventors: Miroslav M. Kolpak, Arlington; Richard L. Payne, Mckinney; James C. Wilcoxson, Plano, all of Tex.

[73] Assignee: Atlantic Richfield Company, Plano, Tex.

[21] Appl. No.: 198,977

[22] Filed: Feb. 18, 1994

[51] Int. Cl.$^6$ .................................................. G01F 1/74
[52] U.S. Cl. ...................................... 73/861.04; 73/191
[58] Field of Search ............. 73/861.04, 861.52, 19.05, 73/19.1, 61.44, 61.47

[56] References Cited

U.S. PATENT DOCUMENTS

| | | | |
|---|---|---|---|
| 4,788,852 | 12/1988 | Martin et al. | 73/861.04 |
| 4,876,897 | 10/1989 | DeCarlo et al. | 73/861.04 |
| 4,884,457 | 12/1989 | Hatton | 73/861.04 |
| 5,099,697 | 3/1992 | Agar | 73/861.04 |

Primary Examiner—Herbert Goldstein
Attorney, Agent, or Firm—Michael E. Martin

[57] ABSTRACT

Multiphase fluid flow, such as a mixture of oil, water and gas, is measured by a system which includes one or two densitometers for measuring the multiphase fluid density flowing through a flowline or conduit and a flow restriction, pump, expander or heat exchanger interposed in the flowline between the densitometers to effect a pressure or temperature change in the multiphase fluid. Densities, pressures and temperatures are measured on the upstream and/or downstream sides of the flow restriction, pump, expander or heat exchanger and the measured values of density, pressure and temperature are used to obtain the flow rates of the respective phases in the flowstream.

14 Claims, 1 Drawing Sheet

MULTIPHASE FLUID FLOW MEASUREMENT

BACKGROUND OF THE INVENTION

1. Field of the Invention

The present invention pertains to measurement of multiphase fluid (liquid and gas) flow using one or more densitometers, a pump, flow restriction or heat exchanger to effect a change in pressure and temperature of the fluid flow and pressure and temperature sensors for measuring the flowstream both upstream and downstream of the restriction, pump or heat exchanger.

2. Background

Various methods have been developed for measuring multiphase fluid flow where widely varying ratios of gas to liquid are experienced and wherein a high degree of measurement accuracy may or may not be important. U.S. patent application Ser. No. 08/131,813, filed Oct. 5, 1993, and U.S. patent application Ser. No. 08/179,411, filed Jan. 10, 1994, both by M. M. Kolpak and both assigned to the assignee of the present invention, describe various types of flowmeters for measuring multiphase fluid flow, particularly mixtures of oil, water and gas which result from the production of hydrocarbons from subterranean wells. U.S. Pat. No. 5,099,697, issued Mar. 31, 1992 to J. Agar, also describes a multiphase fluid flow measurement system adapted to measure flows of oil, water and gas.

However, there has been a continuing need to develop flow measurement systems and methods which may be easily adapted to existing flow lines leading from subterranean wells, flow lines leading to or from separation devices for separating gas from liquid and similar applications where a high degree of accuracy is not required, where a relatively high percentage of the flow is gas and wherein minimal interruption of the fluid flow system is required or is desirable.

Many types of known flowmeter systems do not perform well where a high gas-to-liquid ratio or gas fraction of the total volumetric flow exists or wherein a substantial number of fluid parameters, including fluid density, must be premeasured or otherwise known in order to perform the measurement method. The devices and methods described herein overcome some of the deficiencies of existing multiphase fluid flow measurement systems and methods.

SUMMARY OF THE INVENTION

The present invention provides an improved system and method for measuring multiphase (liquid and gas) fluid flow including flow wherein a relatively high gas content or so-called gas fraction of the total volume is frequently encountered. In accordance with one important aspect of the present invention, an improved multiphase fluid flow measurement system is provided wherein one or two fluid densitometers are adapted to measure the density of the multiphase fluid flowstream and a flow restriction or other pressure or temperature changing device is interposed in the flow line between the densitometers and further wherein the fluid pressures and temperatures are measured on opposite sides of the fluid-pressure or temperature changing device.

In accordance with another important aspect of the present invention, a fluid flow measurement system and method is provided wherein the determination of the liquid and gas fractions and flow rates take into account the temperature changes, gas flashing and liquid shrinkage (compressibility).

In accordance with yet another aspect of the present invention, multiphase fluid flow measurement systems and methods are provided wherein multiphase fluid flow from a subterranean well may be easily and accurately determined by employing two densitometers spaced apart on opposite sides of a flow restriction, such as a wellhead choke, and together with pressure and temperature sensors disposed for sensing pressure and temperature on opposite sides of the choke. An inexpensive and easily adapted flow measurement system may thus be employed.

The present invention provides an inexpensive way to monitor multiphase fluid flow, particularly from subterranean wells and from treatment and separation facilities for handling the fluid flow from such wells. The system may be easily retrofitted to existing facilities which require multiphase fluid flow measurement and the cost of the system is expected to be less than other types of multiphase fluid flow measurement systems and where accuracies of flow measurement in the range of eighty-five percent to ninety percent are acceptable.

Those skilled in the art will recognize the advantages and superior features of the systems and methods described above as well as other superior aspects of the invention upon reading the detailed description which follows in conjunction with the drawing.

DESCRIPTION OF PREFERRED EMBODIMENTS

Figure 1:
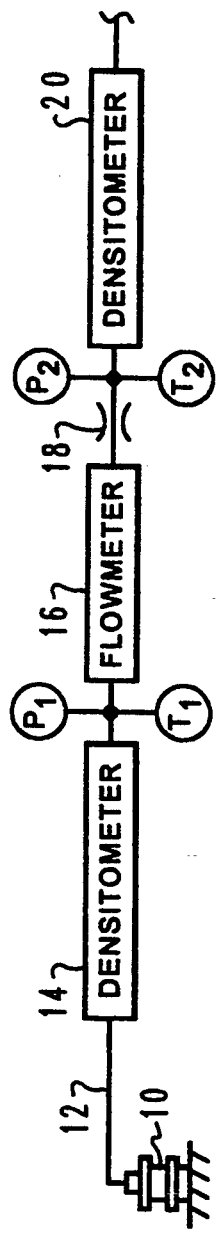
FIG. 1 is a schematic diagram of one preferred embodiment of a multiphase fluid flowmeter.

In the description which follows, like parts are marked throughout the specification and drawing with the same reference numerals. The drawing figures are in schematic form in the interest of clarity and conciseness.

Referring to FIG. 1, there is illustrated a schematic of a flow measurement system which is adapted to measure multiphase fluid flow with a relatively high gas fraction as a percent of the total volumetric flow rate, nominally about twenty five percent (25%) or more. FIG. 1 illustrates a wellhead 10 which is operable to produce hydrocarbon fluids such as mixtures of liquid and gas and wherein the liquid phase of the fluid may comprise oil and water. The wellhead 10 is connected to a flowline 12 having a first densitometer 14 interposed therein and which may be of a type which does not require intrusion into the flowpath of the fluid flowing through the flowline 12. A suitable volumetric flowmeter 16 is also interposed in the flowline 12 and a suitable flow restriction such as a venturi, orifice or oil field choke device 18 is also interposed in the flowline 12. The flowmeter 16 and flow restriction 18 are interposed in the flowline between the first densitometer 14 and a second densitometer 20 which also may be of a type which is non-invasive into the flowpath of the fluid flowing through the flowline 12. The densitometers 14 and 20 may be of the so-called gamma-ray type such as commercially available from Texas Nuclear, Inc. of Austin, Tex. as their SGD Series. The flow measuring system of FIG. 1 includes pressure and temperature sensors disposed for sensing the pressures and temperatures of the fluids flowing through the flowline 12 on opposite sides of the flow restriction 18. It is assumed that the flowmeter 16 does not cause a significant pressure or temperature change of fluid flowing therethrough although the flowmeter could have a suitable flow restriction or pressure change device incorporated therein in addition to the volumetric flow measuring mechanism. The flow restriction 18 can be a valve or similar device also.

The flow restriction 18 causes a pressure decrease and a corresponding expansion of the fluid flowing through the flowline 12. The expansion causes the downstream densitometer 20 to register a lower density of the fluid flowing therethrough than the upstream densitometer 14. Alternatively, in accordance with the present invention, the flow restriction 18 could be a pump or turbine. In all cases, the method of determining the liquid and gas flow rates for the multiphase fluid flowing through the system of FIG. 1 may be carried out whether a pressure increase or decrease occurs across the flow restriction 18.

The liquid fraction, $f_L$ may be determined by a suitable computational device such as a microprocessor which has been programmed to make certain calculations based on the equations given below. The volumetric liquid fraction in the total flow is determined from the following equation.

$$f_L = ((T_2/T_1)*(P_1/P_2)-1)/(d_1/d_2-1)-1 \qquad (1)$$

where, ($T_1, T_2$) = measured temperature upstream and downstream of the restriction 18

($P_1, P_2$) = measured pressure upstream and downstream of the restriction 18, and ($d_1, d_2$) = measured density at upstream and downstream of the restriction 18.

Liquid and gas volumetric flow rates, ($Q_{1L}, Q_{1G}$), are determined from $$Q_{1L} = f_L * Q \qquad (2)$$

$$Q_{1G} = (1 - f_L) * Q \qquad (3)$$

where Q is the combined flow rate measured by the flowmeter 16. The subscripts 1 and 2 denote the flow conditions of the multiphase fluid upstream and downstream of the flow restriction 18 or other element interposed between the densitometers as indicated by the pressure and temperature sensor symbols in the drawing figures.

The gas laws hold that for a volume of gas, V, $$PV/T = \text{constant} \qquad (7)$$

The change in gas volume (dV) which results from the flow restriction or pressure changing element 18 may be expressed as follows in accordance with the gas laws.

$$dV = V_1\{(T_2/T_1)(P_1/P_2) - 1\} \qquad (8)$$

If both sides of equation (8) are divided by time, the analogous relationship for volumetric rate is provided as:

$$dQ = Q_{1G}\{(T_2/T_1)(P_1/P_2) - 1\} \qquad (9)$$

where $Q_{1G}$ is the upstream gas flow rate and dQ also equals the difference between upstream and downstream flow rates $$dQ = Q_2 - Q_1 \qquad (10)$$

Equating the mass flow rate upstream and downstream yields $$d_1 Q_1 = d_2 Q_2 \qquad (11)$$

were $d_1$ and $d_2$ are upstream and downstream densities measured by the densitometers 14 and 20.

The upstream flow rate is composed of gas and liquid rates $$Q_1 = Q_{1L} + Q_{1G} \qquad (12)$$

and the liquid fraction, $f_L$, is defined as $$f_L = Q_{1L}/(Q_{1L} + Q_{1g}) \qquad (13)$$

Combining equations (7) through (13) yields equations (1) through (3).

The arrangement of FIG. 1 is not only useful for measuring multiphase fluid flow from a well with relatively high gas fraction but the system of FIG. 1 is also easily adapted to be installed on the gas flowlines from multiphase fluid separators, for example. In multiphase fluid handling facilities where so-called liquid carry-over into the gas discharge flowline from a separator vessel is a frequent occurrence due to inadequate separator size, slug flow conditions or the like, the elements of a flowmeter, a temperature and pressure sensor and a throttling valve are usually present.

Accordingly, in order to be able to measure both gas and liquid flow, all that is required for such an installation is the additional installation of the densitometers 14 and 20 arranged as illustrated in FIG. 1 on opposite sides of the flowmeter 16 and the flow restriction 18 and the addition of a pressure and temperature sensor. Densitometers, such as the above-mentioned commercially available gamma ray type, may be merely strapped onto the exterior of a conventional, cylindrical pipe flowline. The addition of a pressure and temperature sensor to the flowline is also normally an easy adaptation. Accordingly, the liquid and gas volumetric flow rates and mass flow rates, as well as the liquid and gas fractions of the total flow may be easily determined using a flow measurement system as shown in FIG. 1 and carrying out the calculations of equations (1) through (3) based on the measurements of temperatures and pressures on opposite sides of a flow restriction, the total volumetric flow rate upstream of a flow restriction and the density of the multiphase fluid flowstream on opposite sides of the flow restriction. The method described above in conjunction with the system of FIG. 1 is useful for fluid flowstreams with relatively high gas to liquid volumetric ratios but does not account for gas coming out of solution or liquid "flashing" to gas as a result of the pressure or temperature changes.

Figure 2:
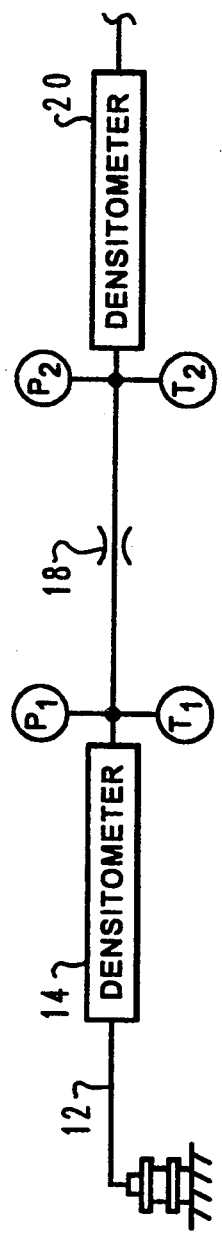
FIG. 2 is a schematic diagram of a second preferred embodiment of a multiphase fluid flowmeter.
Figure 3:
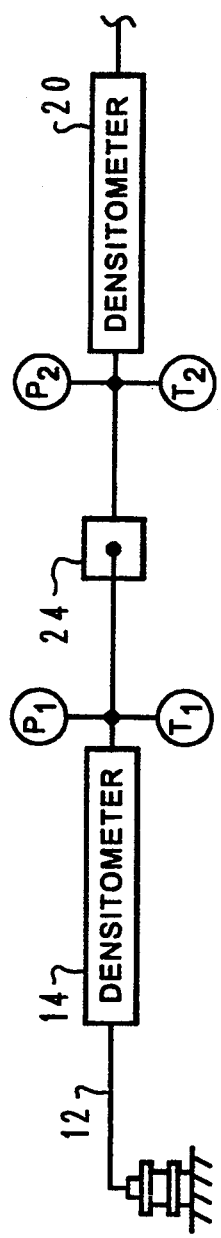
FIG. 3 is a schematic diagram of a third preferred embodiment of a multiphase fluid flowmeter.
Figure 4:
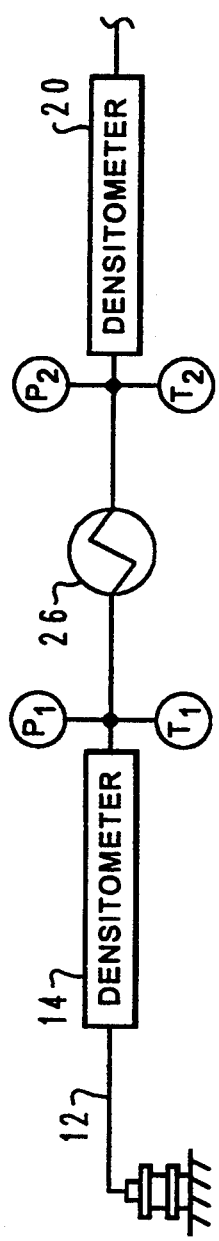
FIG. 4 is a schematic diagram of a fourth preferred embodiment of a multiphase fluid flowmeter in accordance with the present invention.

FIGS. 2 through 4 illustrate, in schematic form, flow measurement systems which may be suitable for many flow measurement applications of multiphase fluid flow wherein low cost and easy installation of the system are important, the gas fraction may be more or less than twenty five percent (25%) of the total fluid flow, on a volumetric basis, and the accuracy of the system is a secondary consideration. The systems illustrated in FIGS. 2 through 4 are capable of providing multiphase fluid flow measurement using methodology described herein. The system of FIG. 2 includes the densitometers 14 and 20 disposed on opposite sides of a flow restriction 18 which may be one of several devices as described above in conjunction with the system of FIG. 1. Pressures and temperatures are measured in the flowline 12 on both sides of the restriction 18 with respect to fluid flow.

FIG. 3 illustrates a system similar to FIG. 2 which includes the densitometers 14 and 20 associated with the flow line 12 and a pump 24 interposed in the flowline between the densitometers. Pressures and temperatures are measured on opposite sides of the pump 24 with respect to flow through the flowline 12. The "pump" 24 may operate to increase the pressure so that pressure $P_2$ is greater than $P_1$ or the pump 24 may comprise an expansion device, such as a turbine, wherein the pressure $P_2$ is lower than $P_1$. In any case, the method of the invention set forth herein is applicable.

Still further, the flow measurement system of FIG. 4 includes the densitometers 14 and 20, the pressure and temperature sensors located where indicated and a heat exchanger 26 interposed in the flowline 12 between the pressure and temperature sensing devices and the densitometers. The temperature of the multiphase fluid flowing through the flowline 12 and the heat exchanger 26, as well as the pressures, may be raised or lowered by suitable heat exchange. Those skilled in the art will recognize that the systems illustrated in FIGS. 2 and 4 may be characterized by a relatively lengthy section of flowline between the densitometers 14 and 20 and the pressure and temperature sensors wherein pressure in the flowline 12 will decrease between the densitometers and the pressure and temperature sensors due to friction flow losses in the flowline or the temperature of the fluid flowing therethrough may decrease between measurement points, with the system of FIG. 4, due to heat exchange between the fluid in the flowline 12 and the exterior of the flowline. For practical purposes, the location of the densitometers 14 and 20 and the pressure and temperature sensors may require to be close enough together that actual flow restriction, pumping devices or actual heat exchange devices may require to be used to effect a suitable change in the pressures and temperatures of the multiphase fluid.

The systems of FIGS. 2 through 4 may also be adapted to provide data to an on-line computer, not shown, programmed to perform the calculations given below. The subscripts 1 and 2 denote the upstream and downstream densities, pressures and temperatures measured by the elements indicated in the drawing figures. The fluid measurement systems of FIGS. 2 through 4 are also adapted to determine the flow rates of respective liquids in the liquid component of the multiphase fluid flowstream, namely water and oil as a mixture of two liquids in the liquid phase.

The measured data are as follows:

$d_{m1}$, $d_{m2}$ = aggregate densities of the flow; given by the densitometers $P_1$, $P_2$ = pressures $T_1$, $T_2$ = temperatures fluid property data $G_w$ = water specific gravity; (fresh water = 1)

$G_o$ = oil specific gravity; deg API $G_g$ = gas specific gravity; (air = 1)

$R_s$ = solution gas-oil ratio; std. cubic ft. gas dissolved per stock tank barrel of oil $R_{sw}$ = solution gas-water ratio; std. cubic ft. gas dissolved per stock tank barrel of water $B_o$ = oil formation volume factor; volume of oil with dissolved gas per stock tank barrel of oil $B_w$ = water formation volume factor; volume of water with dissolved gas per stock tank barrel of water where $R_s$, $R_{sw}$, $B_o$ and $B_w$ are correlations which are functions of temperature, pressure and gas and oil gravities. Examples of such correlations are given in the publication entitled "Critical and Sub-Critical Flow of Multiphase Mixtures Through Chokes" by Perkins, T. K., Society of Petroleum Engineers Publication No. SPE 20633, September 1990.

Pressure changes in the stream caused by the constriction (or pump) cause gas to flash from (or dissolve in) the liquids and to change in volume. Equations set forth herein account for these effects in determining the fluid fractions $f_{w1}$, $f_{o1}$ and $f_{g1}$ which are, respectively, the volumetric water fraction, oil fraction and gas fraction upstream of the flow restriction or pump.

A computer may then determine oil, water and gas flow rates by substituting $$P_1, T_1, P_2, f_w, f_o, f_g, G_w, G_o, G_g, R_s, R_{sw}, B_o, B_w \qquad (14)$$

into a set of equations describing the physics of flow through the flow restriction (or pump), and computing the mass flow rate, W, through it. In essence, the flow restriction (pump) provides information about the flow which is utilized; it causes measurable changes in the pressure and/or temperature and/or density, which uniquely determine W. Fluid volumetric flow rates are then computed, knowing W and fluid fractions.

Gas Densities

Densities of the gas at standard temperature and pressure (STP) and conditions at stations 1 and 2 of the systems of FIGS. 1 through 4 are, respectively, $$dgSTP = 29.G_g.14.7/(10.73.520) \qquad (15)$$

$$dg1 = 29.G_g.P_1/(10.73.(460+T_1).z_1) \qquad (16)$$

$$dg2 = 29.G_g.P_2/(10.73.(460+T_2.z_2) \qquad (17)$$

Liquid Flow Rates

Oil volume rates at stations 1 and 2 can be thought of as comprising a "dead" oil portion (stock tank barrels per day) and an additional amount due to dissolved gas.

The dead oil portion of the oil rates at stations 1 and are given by $$Q_{Do1} = Q_{o1}/B_{o1} \qquad (18)$$

$$Q_{Do2} = Q_{o2}/B_{o2} \qquad (19)$$

where ($Q_{o1}$, $Q_{o2}$) are the volumetric flow rates of live oil at (1,2) and $B_{o1}$ = oil formation volume factor; volume of oil (with dissolved gas), at [$T_1$,$P_1$], per stock tank barrel of oil $B_{o2}$ = oil formation volume factor; volume of oil (with dissolved gas), at [$T_2$,$P_2$], per stock tank barrel of oil Conservation of mass requires that $$Q_{Do1} = Q_{Do2} = Q_{Do} \tag{20}$$

thus equations (18) and (19) yield $$Q_{o2} = Q_{o1}(B_{o2}/B_{o1}) \tag{21}$$

Similar reasoning for "live" water flow yields $$Q_{w2} = Q_{w1}(B_{w2}/B_{w1}) \tag{22}$$

where
$B_{w1}$ = water formation volume factor; volume of water (with dissolved gas), at [$T_1 P_1$], per stock tank barrel of water
$B_{w2}$ water formation volume factor; volume of water (with dissolved gas), at [$T_2, P_2$], per stock tank barrel of water Gas Flow Rates Total gas rate passing station 1, when converted to STP, is $$QTOT_{g1STP} = Q_{g1}(d_{g1}/d_{gSTP}) + Q_{Do}R_{s1} + Q_{Dw}R_{sw1} \tag{23}$$

in which the first term is the free (undissolved) gas and the second and third terms are dissolved gas in the oil and water, respectively.

Substituting equation (18) and its analog for water into equation (23) yields, $$QTOT_{g1STP} = Q_{g1}(d_{g1}/d_{gSTP}) + Q_{o1}(R_{s1}/B_{o1}) + Q_{w1}(R_{sw1}/B_{w1}) \tag{24}$$

Conservation of mass requires that $$QTOT_{g2STP} = QTOT_{g1STP} \tag{25}$$

The free gas (undissolved portion) passing station 2 can therefore be expressed as $$Q_{g2STP} = QTOT_{g1STP} - Q_{Do}R_{s2} - Q_{Dw}R_{sw2} \tag{26}$$

in which the first term is the total gas and the second and third are the gas in solution in the oil and water, respectively.

Substituting equation (18) and its analog for water, and equation (24) in equation (26) and converting to ambient conditions at station 2, yields $$Q_{g2} = (d_{gSTP}/d_{g2})\{Q_{g1}(d_{g1}/d_{gSTP}) + Q_{o1}((R_{s1} - R_{s2})/B_{o1}) + Q_{w1}((R_{sw1} - R_{sw2})/B_{w2})\} \tag{27}$$

Liquid Densities

Density of dead oil is given by $$d_{Do} = 62.4 * 141.5/(131.5 + G_o) \tag{28}$$

where $G_o$ is the API oil gravity. Equation (28) could be altered to account for pressure and temperature effects on density.

At station 1, oil density equals the quotient of mass rate of oil $W_{o1}$ and volume rate of oil $Q_{o1}$.

$$W_{o1} = d_{Do}(Q_{o1}/B_{o1}) + d_{gSTP}(Q_{o1}R_{s1}/B_{o1}) \tag{29}$$

where the first term is the mass rate of dead oil and the second term is the mass rate of the dissolved gas.

Dividing $Q_{o1}$ into equation (29) yields the oil density $$d_{o1} = (d_{Do} + R_{s1}d_{gSTP})/B_{o1} \tag{30}$$

Similar reasoning for water density and for densities at station 2 yield, $$d_{w1} = (d_{Dw} + R_{sw1}d_{gSTP})/B_{w1} \tag{31}$$

$$d_{o2} = (d_{Do} + R_{s1}d_{gSTP})/B_{o1} \tag{32}$$

$$d_{w2} = (d_{Dw} + R_{sw2}d_{gSTP})/B_{w2} \tag{33}$$

Fluid Fractions at Station 2

The total flow rate at station 2 is $$QTOT_2 = Q_{o2} + Q_{w2} + Q_{g2} \tag{34}$$

Fluid fractions are $$f_{o2} = Q_{o2}/QTOT_2 \tag{35}$$

$$f_{w2} = Q_{w2}/QTOT_2 \tag{36}$$

$$f_{g2} = Q_{g2}/QTOT_2 \tag{37}$$

Substituting equations (21), (22) and (27) in (35), (36) and (37) yields $$f_{o2} = f_{o1} * (a_1/a_6) \tag{38}$$

$$f_{w2} = f_{w1} * (a_2/a_6) \tag{39}$$

$$f_{g2} = f_{g1} * ((a_4 Q_{o1} + a_5 Q_{w1} + a_3 Q_{g1})/a_6) \tag{40}$$

where $$a_6 = f_{o1}(a_1 + a_2) + f_{w1}(a_2 + a_5) + f_{g1}(a_3) \tag{41}$$

$$a_1 = B_{o2}/B_{o1} \tag{42}$$

$$a_2 = B_{w2}/B_{w1} \tag{43}$$

$$a_3 = d_{g1}/d_{g2} \tag{44}$$

$$a_4 = (d_{gSTP}/d_{g2})(R_{s1} - R_{s2})/B_{o1} \tag{45}$$

$$a_5 = (d_{gSTP}/d_{g2})(R_{sw1} - R_{sw2})/B_{w1} \tag{46}$$

Solution For Two Densitometers

Three equations in terms of three unknowns, the volumetric fractions of oil, water and gas ($f_{o1}, f_{w1}, f_{g1}$) are solved. These are $$f_{o1} + f_{w1} + f_{g1} = 1 \tag{47}$$

$$d_{o1}f_{o1} + d_{w1}f_{w1} + d_{g1}f_{g1} = d_{m1} \tag{48}$$

$$d_{o2}f_{o2} + d_{w2}f_{w2} + d_{g2}f_{g2} = d_{m2} \tag{49}$$

the first stating that the sum of fractions must equal unity, the second and third that the aggregate densities ($d_{m1}, d_{m2}$) of the fluid mixture at stations 1 and 2 equal the sum of component densities weighted by their respective fractions. Converting ($f_{o2}, f_{w2}, f_{g2}$) in equation (49) to their equivalents in terms of ($f_{o1}, f_{w1}, f_{g1}$); equations (38) through (46), a solution for the three fractions is obtained.

The fluid fractions so determined may be input to a physical model of the constriction or pump, together with properties, pressures and temperatures, to determine the total mass flow rate, WTOT, through it. The equations in the Perkins reference are such a model, suitable for oil well chokes. Other possibilities include, but are not restricted to, equations for an orifice, venturi or pump.

Since WTOT is the product of aggregate flow rate $QTOT_1$ and measured density $d_{m1}$ $$WTOT = QTOT_1 * d_{m1} \quad (50)$$

the solution for flow rates of individual components is $$Q_{o1} = (d_{m1}/WTOT)f_{o1} \quad (51)$$

$$Q_{w1} = (d_{m1}/WTOT)f_{w1} \quad (52)$$

$$Q_{g1} = (d_{m1}/WTOT)f_{g1} \quad (53)$$

Alternatively to obtaining WTOT from a physical model, measuring $QTOT_1$ via a volumetric flowmeter will provide values of $QTOT_1$ in equation (50).

Solution for Heavy Oil

When oil and water densities are close or equal, the second densitometer, represented by equation (49), will not be needed. Equations (47) and (48) can be written $$f_{l1} + f_{g1} = 1 \quad (54)$$

$$d_{l1}f_{l1} + d_{g1}f_g = d_{m1} \quad (55)$$

where oil and water terms have been replaced by terms representing the liquid mixture (subscript 1). Equations (50) and (51) are solved for the two unknowns $f_{l1}$ and $f_{g1}$.

Proceeding analogously to the case for two densitometers, either WTOT or $QTOT_1$ is measured and the solution for flow rates is $$Q_{l1} = (d_{m1}/WTOT)f_{l1} \quad (56)$$

$$Q_{g1} = (d_{m1}/WTOT)f_{g1} \quad (57)$$

The total mass flow rate W through a flow restriction, such as a choke, can be computed from the equations given in the aforementioned Perkins reference. Alternatively, if total flow rate is measured by a volumetric flowmeter to give QTOT, then fluid flow rates of the components of the multiphase fluid mixture are computed knowing the total volumetric flow rate and the fluid fractions. Moreover, if fluid densities are well known and the flow is not in the slug regime, accuracies of the systems described and illustrated in conjunction with FIGS. 2 through 4 may be at least ninety percent (90%), particularly for gas fractions of twenty five percent (25%) or more.

The present invention provides a relatively inexpensive system and method for monitoring multiphase fluid flow such as flow from oil and gas production wells, process flowstreams and the like. The systems may be readily adapted to existing facilities without major modification to the flowlines for process conditions and the total cost of the system components is expected to be considerably less than more complicated multiphase flow measurement systems in the prior art. When measuring mixtures of oil and water, if the densities of these fluids are nearly equal, such as in the production of heavy oil, then the equations become error prone. In such case, the equations can be recast in terms of liquid densities rather than separate oil density and water density and the downstream densitometer would not be required.

Although preferred embodiments of a flow measurement system and methods associated therewith have been described in detail herein, those skilled in the art will recognize that certain substitutions and modifications may be made without departing from the scope and spirit of the appended claims.

What is claimed is:

1. A multiphase fluid flow measurement system for measuring a mixture of gas and liquid, said system comprising:
    a flowline for conducting multiphase fluid flow;
    a volumetric flowmeter interposed in said flowline for measuring the volumetric flow rate of a multiphase fluid;
    means interposed in said flowline for effecting a change in pressure in the multiphase fluid flow;
    pressure and temperature sensor means operably connected to said flowline for measuring the multiphase fluid pressures and temperatures upstream of said means and downstream of said means, respectively, with respect to the direction of flow of fluid through said flowline; and
    densitometers associated with said flowline for measuring the density of multiphase fluid flowing through said flowline at a point upstream of said means and downstream of said means, respectively, with respect to the direction of flow of fluid through said flowline.

2. The system set forth in claim 1 wherein:
    said means comprises a flow restriction for effecting a pressure decrease in the multiphase fluid flowing through said flowline.

3. The system set forth in claim 1 wherein:
    said means comprises a pump for increasing the pressure of said multiphase fluid flowing through said flowline.

4. The system set forth in claim 1 wherein:
    said means comprises a heat exchanger for effecting a change in temperature of said multiphase fluid flowing through said flowline.

5. A multiphase fluid flow measurement system for measuring a mixture of gas and liquid, said system comprising:
    a flowline for conducting multiphase fluid flow;
    means interposed in said flowline for effecting a change in pressure in the multiphase fluid flow comprising at least one of a flow restriction, pump and expander;
    pressure and temperature sensor means operably connected to said flowline for measuring the multiphase fluid pressures and temperatures upstream of said means and downstream of said means, respectively, with respect to the direction of flow of fluid through said flowline; and
    densitometer means associated with said flowline for measuring the density of multiphase fluid flowing through said flowline at least at one of a point upstream of said means and downstream of said means, respectively, with respect to the direction of flow of fluid through said flowline.

6. A multiphase fluid flow measurement system for measuring a mixture of gas and liquid, said system comprising:
    a flowline for conducting multiphase fluid flow;
    means interposed in said flowline for effecting a change in at least one of pressure and temperature in the multiphase fluid flow comprising at least one of a flow restriction, pump, expander and heat exchanger;

pressure and temperature sensor means operably connected to said flowline for measuring the multiphase fluid pressures and temperatures upstream of said means and downstream of said means, respectively, with respect to the direction of flow of fluid through said flowline; and densitometer means associated with said flowline for measuring the density of multiphase fluid flowing through said flowline at least at one of a point upstream of said means and downstream of said means, respectively, with respect to the direction of flow of fluid through said flowline.

7. A method for determining the liquid fraction of a multiphase fluid flowstream flowing through a conduit, said conduit having means interposed therein for effecting a change in at least one of pressure and temperature of the fluid flowstream, said method comprising the steps of:

measuring the temperature and pressure of the multiphase fluid flowstream both upstream and downstream of said means with respect to the direction of flow of said multiphase fluid;

measuring the density of the multiphase fluid flowstream both upstream and downstream of said means, and calculating the liquid fraction of the flowstream based on the measured temperatures and measured pressures and the measured densities.

8. The method set forth in claim 7 including the step of:

determining the volumetric flow rate of liquid in the multiphase fluid flowstream based on the liquid fraction and the total volumetric flow of multiphase fluid in said conduit.

9. The method set forth in claim 7 including the step of:

determining the volumetric gas flow rate in said multiphase fluid flowstream based on the liquid fraction and the volumetric flow rate of multiphase fluid through said conduit.

10. The method set forth in claim 7 wherein:

the step of determining the liquid fraction in said multiphase fluid flowstream is carried out using the equation:

$$f_L = ((T_2/T_1)*(P_1/P_2)-1)/(d_1/d_2-1)-1$$

where, $(T_1,T_2)$ = measured temperature upstream and downstream of said means $(P_1,P_2)$ = measured pressure upstream and downstream of said means, and $(d_1,d_2)$ = measured density upstream and downstream of said means.

11. A method for determining the fractions of water, oil and gas in a multiphase fluid mixture comprising said oil, water and gas flowing through a flowline, said flowline including means comprising at least one of a flow restriction, pump, expander and heat exchanger, pressure and temperature sensors located in said flowline upstream and downstream of said means and densitometer means disposed at least at one of upstream and downstream of said means for measuring the density of said multiphase fluid flowing through said flowline, said method comprising the steps of:

(a) measuring the densities, pressures and temperatures of said multiphase fluid;

(b) determining the specific gravity of said water, oil and gas in said multiphase fluid flowstream;

(c) determining the solution gas to oil ratio, the solution gas to water ratio, the oil formation volume factor and the water formation volume factor;

(d) determining the fraction of water, oil and gas in said multiphase fluid mixtures; and (e) determining the oil, water and gas flow rates based on the measured densities, pressures and temperatures and the factors determined in steps (b), (c) and (d).

12. The method set forth in claim 11 including the step of:

determining the oil flow rate based on the oil formation volume factor at the temperature and pressure conditions upstream and downstream of said means.

13. The method set forth in claim 11 including the step of:

determining the water flow rate based on the water formation volume factor at the temperature and pressure conditions upstream and downstream of said means.

14. The method set forth in claim 13 including the step of:

determining the total gas flow rate based on the gas densities, the oil volumetric flow rate, the water volumetric flow rate and the solution gas/oil ratio, the solution gas/water ratio, the oil formation volume factor and the water formation volume factor.

* * * * *